Jan. 11, 1949.    Z. A. TWARDOWSKI    2,458,809
HOSE COUPLING VALVE
Filed Jan. 2, 1948

INVENTOR.
Zygfred A. Twardowski
BY Louis Chayka
ATTORNEY.

Patented Jan. 11, 1949

2,458,809

UNITED STATES PATENT OFFICE 2,458,809

HOSE COUPLING VALVE

Zygfred A. Twardowski, East Detroit, Mich.

Application January 2, 1948, Serial No. 233

4 Claims. (Cl. 251—8)

In general, my invention pertains to a coupling especially adapted for use in a garden hose whereby two lengths of a hose may be operatively joined in an axial relation to each other, the coupling including valve means whereby the flow of water from the source of supply may be readily shut off. The object of my improvement is to provide means for control of the flow of water at a point distant from the customary connection to an outlet in a building or a vehicle.

A more specific purpose of my invention is to provide a coupling having a valve therein, but including no parts which might protrude outwardly and hinder the reeling or unreeling of the hose.

A further object of my improvement is to provide a coupling wherein the valve means may be operated simply by rotation of a sleeve being a part of the coupling and axially seated upon terminal elements upon the lengths of the hose joined together by said coupling. Another object of my invention is to provide a coupling including a valve of a very simple structural design without sacrificing any of its efficiency.

I shall now describe my invention with reference to the accompanying drawings in which.

Similar numerals refer to similar parts throughout the several views.

Figure 1:
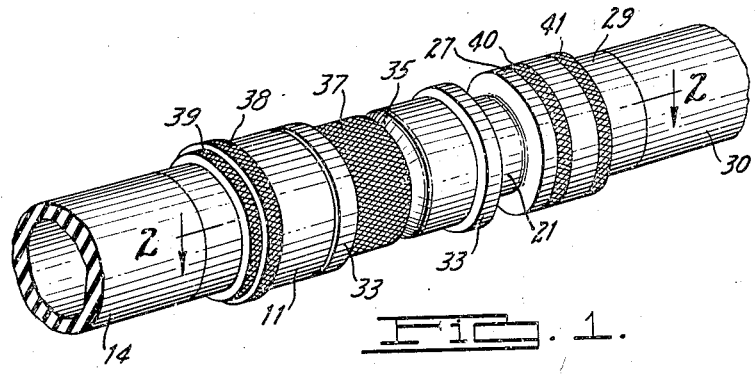
Figure 1 is a perspective view of the coupling with fragments of two lengths of a hose joined together by said coupling.

In general, the coupling improved by me includes two tubular members 10 and 21 disposed axially, but in an opposed relation to each other, and held together by suitable means, and a tubular sleeve mounted upon said members for longitudinal movement thereon. The first-named tubular member 10 has an expanded base portion 11 threaded internally as shown at 12 to form a socket for engagement with a nipple 13 forming a terminal member of a hose 14. A washer 15, seated in the socket against the shoulder 16 at the junction of the socket with the main part of the tubular body 10, serves as the conventional means of securing liquid-tight contact between the respective parts. At the opposite end to that which forms said socket, said member 10 has a cone-shaped head 17, the head having a plurality of apertures 18 disposed around a hole 19 within the apex of said cone. Externally, said member 10 is threaded a part of its length adjoining the cone-shaped head 17 as shown at 20.

Connected to said tubular member 10 in an axial but opposed relation is a substantially similar tubular member 21 having, at the end facing said tubular member 10, a cone-shaped head 22 with a central hole 23 in the apex of the head and a plurality of apertures 24 thereabout. The opposite end 25 of said member 21 is of an expanded diameter and threaded externally as shown at 26, said expanded portion beginning with an annular shoulder 27 substantially midway the length of said tubular member 21. The expanded portion 25 is designed to fit into a socket in a terminal member 29 upon a length of a hose 30. An annular washer 28 is interposed between the above-said portion 25 and the adjoining wall of the socket in member 29 for a liquid-tight contact between the respective parts.

Axially mounted upon the said tubular members 10 and 21 is a sleeve 32, the sleeve including hollow, annular flanges 33, each including an inner sealing length 34 made of rubber or other resilient material. Midway between its ends, the sleeve is constricted into a substantially V-shaped throat as shown by numeral 35. The divergence of the respective portions of the sleeve at the V-shaped formation is at such an angle that it conforms with the inclination of the cone-shaped head of members 10 and 21 respectively. In other words, the sleeve is indented into a V-shaped formation in such a manner that one-half of said formation is parallel to the cone-shaped surface of head 17, and the other half is parallel to the surface of head 22 in tubular members 10 and 21 respectively. A portion of said sleeve on one side of the V-shaped constriction is threaded as shown at 36 for engagement with a threaded external wall 20 of said tubular member 10. As a result of this constriction, it is possible, by rotation of the sleeve, to shift it longitudinally in a reciprocal motion with respect to the heads of members 10 and 21. To facilitate the rotation of the sleeve, it is provided with a knurled surface as shown by numeral 37 in Figure 1. Additionally, knurled surface is applied to a raised projection 38 on the expanded portion 11 of member 10. A similarly raised annular projection 39 on a nipple 13 also shows two parts of the surface of the terminal member 29 on hose 30 as shown by numerals 40 and 41.

Figure 2:
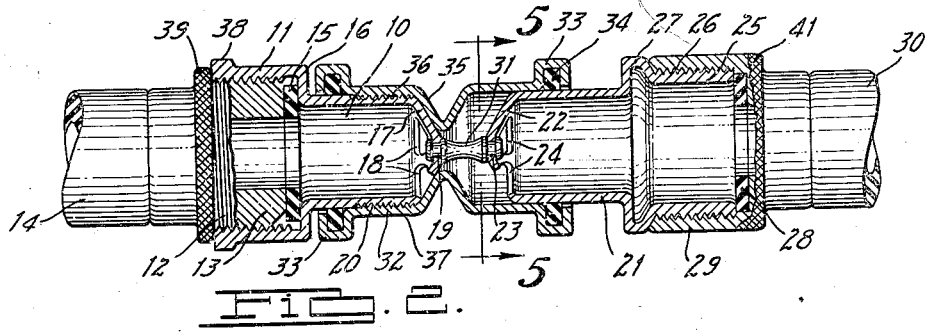
Figure 2 is a longitudinal, sectional view of the coupling taken on line 2—2 of Figure 1.

Now I shall describe the operation of my coupling. It will be assumed that the length of hose 30 is attached to a source of water supply under pressure and that sleeve 32 is in a closed position as shown in Figure 2. As will be seen by reference to Figure 2, the indented portion of the sleeve at 35 abuts the top surface of the cone-shaped head 17 in tubular member 10. As a result thereof, apertures 18 in the head of tubular member 10 are closed. Water, which enters the tubular member 21 of my coupling, fills up the interior space of said member 21, also the inner space of the part of the sleeve between its V-constriction and the head 22 of the tubular member 21 but may not enter into the tubular member 10 and therefrom into hose 14.

Figures 3, 4:
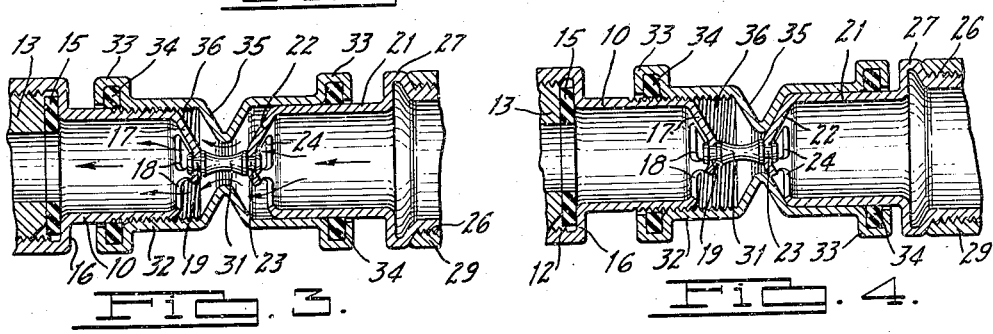
Figure 3 is a view of the same coupling with a valve therein in an open position.
Figure 4 is a sectional veiw of the same coupling with a valve in a closed position.
Figure 5:
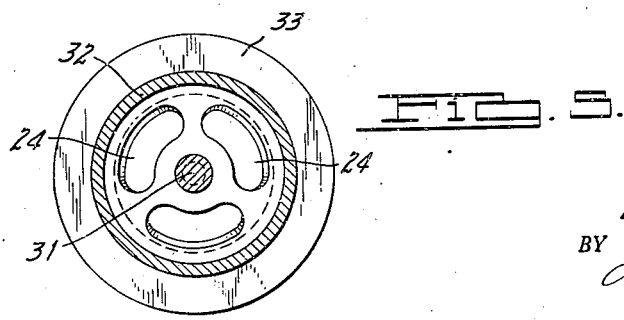
Figure 5 is an enlarged, sectional view on line 5—5 of Figure 2.

Assuming now that it is desired to permit the water to flow into hose 14, a part of which is shown in Figure 2, in order to permit this, the sleeve is rotated manually about its axis. As shown in said Figure 2, the sleeve is threaded, being in engagement with threads 20 in tubular member 10. As a result of said rotation, the sleeve will be moved longitudinally to a position shown in Figure 3, the V-shaped indentation moving away from head 17, but not far enough to get into contact with head 22 of the opposite tubular member 21. Water passing into said tubular member 21 will now be free to pass through apertures 24 in head 22 into the sleeve past the pin 31 into apertures 18 in sleeve 10 and therefrom into hose 14. A continued rotation of the sleeve would bring said sleeve into position shown in Figure 4 where the V-constriction is shown abutting against head 22 of member 21, thus closing apertures 24 and stopping the flow of water out of said tubular member 21.

It will be seen that some changes may be made in the structure of my coupling without departing from the inventive principle disclosed herein. What I, therefore, wish to claim is as follows:

1. A hose coupling of the kind described including two tubular members, each of them being open at one end and threaded for connection to a length of a hose, the other end forming a head including a plurality of apertures therein, the two tubular members being axially aligned but having the heads in opposed relation and held apart by a connecting rod, a sleeve mounted upon the heads of said tubular members, the sleeve including in its mid-length an annular portion extending inwardly into the space between the two heads, and threaded means upon the sleeve in engagement with threads on the outer surface of one tubular member to move said sleeve axially to bring said annular portion into abutment with the head of the respective tubular member to close the apertures therein.

2. A hose coupling of the kind described including two tubular members, each of them being open at one end and threaded for connection to a length of a hose, the other end forming a cone-shaped head including a plurality of apertures therein, the two tubular members being axially aligned, but being held in a spaced and opposed relation to each other by an axial connection rod, a sleeve mounted upon the heads of said tubular members, the sleeve including in its mid-length an annular portion extending inwardly into the space between the two heads but leaving a passage therebetween, and threaded means in one end of the sleeve in engagement with the threads on the outer surface of one tubular member to cause said sleeve to move axially to bring said annular portion in abutment with the head of the respective tubular member to close the apertures therein, and liquid-tight annular sealing means at each end of the sleeve.

3. A hose coupling of the kind described, including two tubular members, each being open at one end, and threaded for connection with a terminal member of a length of a hose, the other end of each tubular member forming a cone-shaped head provided with a plurality of apertures therein, the two heads being held axially in a spaced and opposed relation by a connecting rod, a sleeve mounted upon both of said tubular members, the sleeve being provided at each end with liquid-sealing members therein and being annularly constricted in its mid-portion, the constriction forming a substantially V-shaped indentation, the sleeve having one portion thereof threaded internally for engagement with the threads on the outer surface of one of the tubular members for longitudinal movement of the sleeve upon said members in order to bring the wall of the indentation into abutment with the respective cone-shaped head to close the apertures in said head.

4. A hose coupling of the kind described, including two tubular members disposed axially in an opposed relation to each other, each member having an open end threaded for connection to a length of hose and having the other end formed into a cone-shaped head, including a plurality of apertures therein, the two heads being held together by a connecting member in a spaced relation to each other, and a removable sleeve mounted upon the two members, the sleeve being constricted mid-way its length to form a passage of reduced diameter between the heads of the tubular members, the wall of said sleeve at the constricted portion thereof on each side of the plane of the utmost constriction being disposed parallel to the outer surface of the respective cone-shaped head, the sleeve having one end portion threaded internally for engagement with the threads on one of the tubular members for longitudinal movement of the sleeve from one head against the other for the purpose of bringing the wall of the constriction in the sleeve against the outer surface of the respective head to close the apertures therein.

ZYGFRED A. TWARDOWSKI.

REFERENCES CITED

The following references are of record in the file of this patent:

UNITED STATES PATENTS

| Number | Name | Date |
|---|---|---|
| 248,436 | Porsch | Oct. 18, 1881 |
| 1,850,879 | Hunt | Mar. 22, 1932 |
| 2,125,554 | Franck | Aug. 2, 1938 |
| 2,245,097 | Tobler | June 10, 1941 |

FOREIGN PATENTS

| Number | Country | Date |
|---|---|---|
| 473,539 | Germany | 1926 |